March 10, 1964 G. F. RITTER, JR., ETAL 3,124,444
METHOD AND APPARATUS FOR REMOVING EDGES
DURING FORMING OF SHEET GLASS
Filed March 25, 1960 4 Sheets-Sheet 1

INVENTORS
George F. Ritter, Jr.,
Delmar E. Carney,
Roy A. Nyquist and
Alfred H. Miller
BY Nobbe & Swope
ATTORNEYS

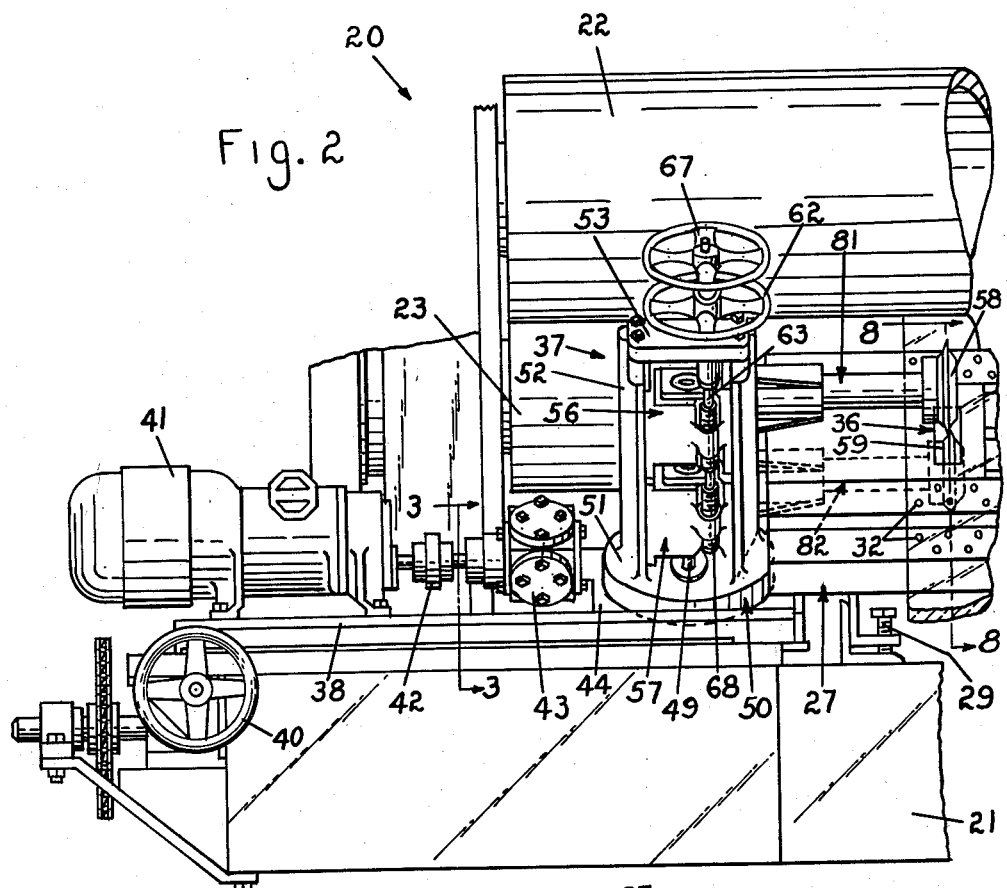
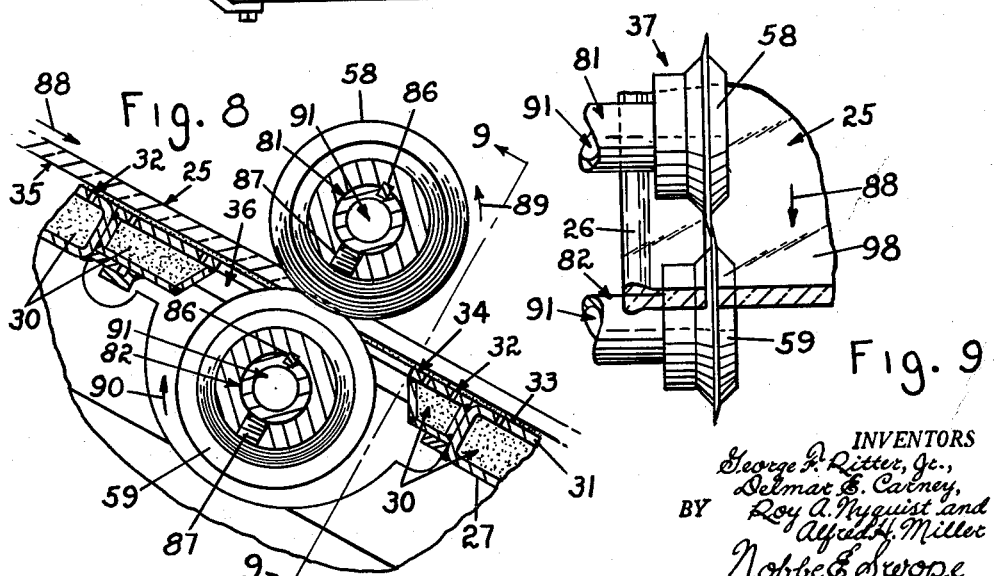

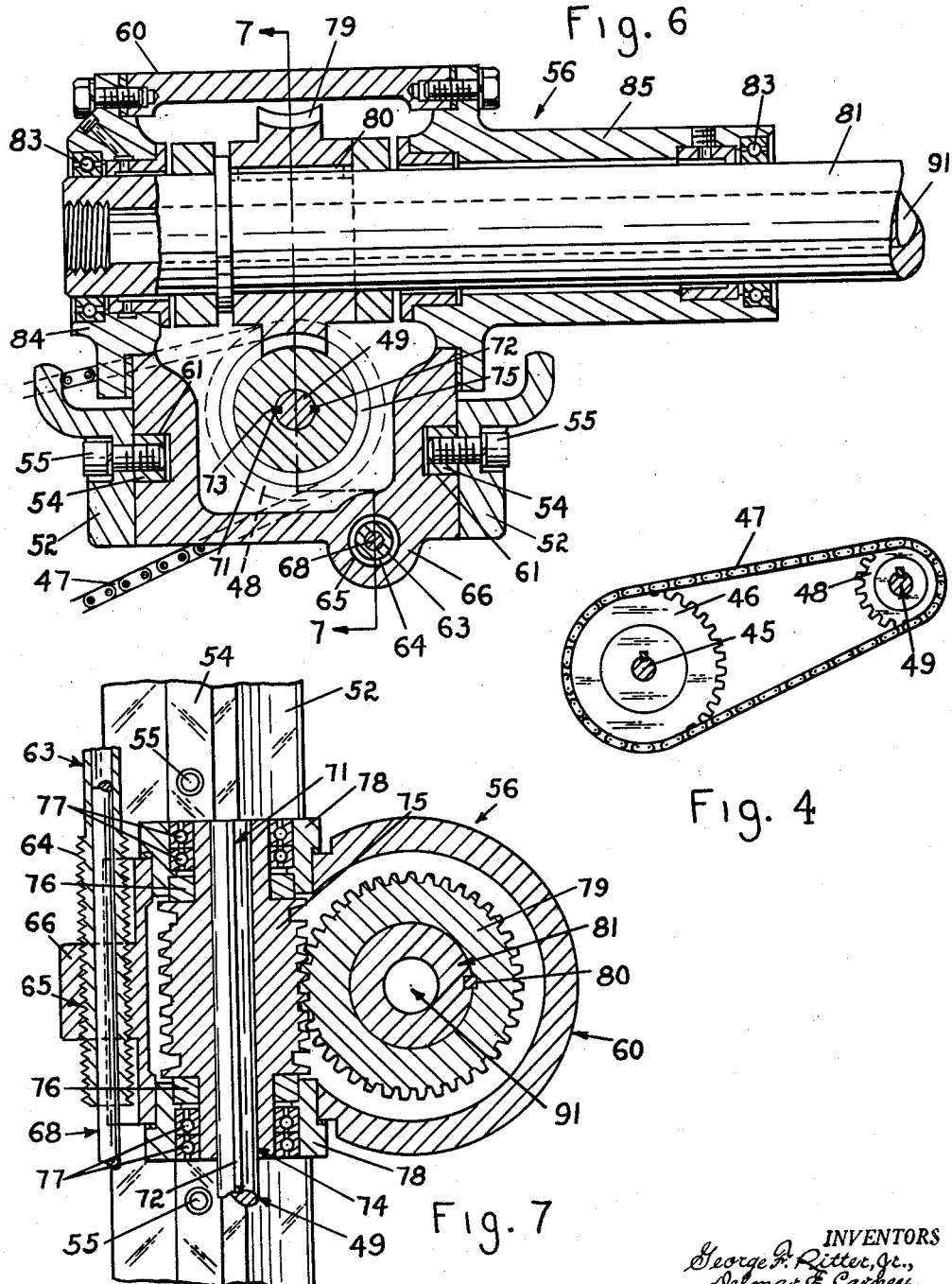

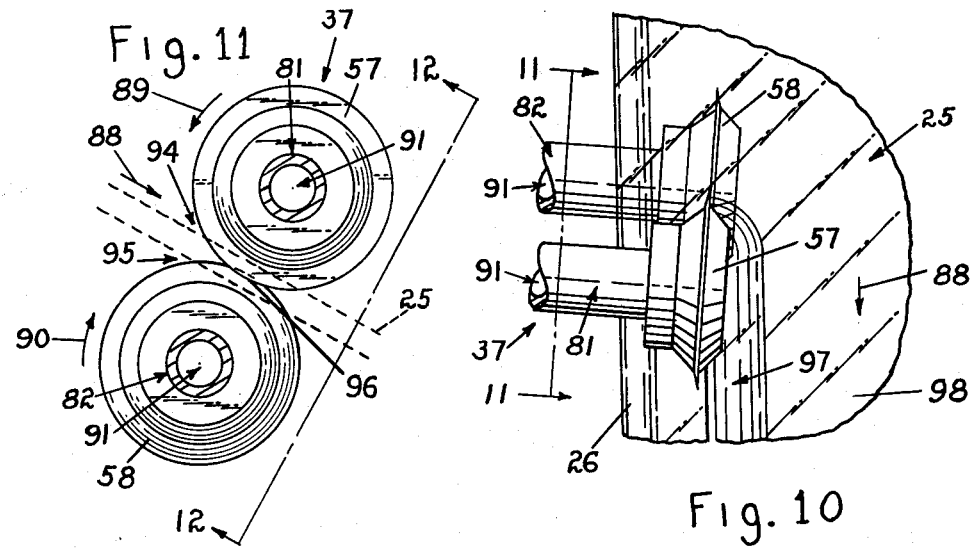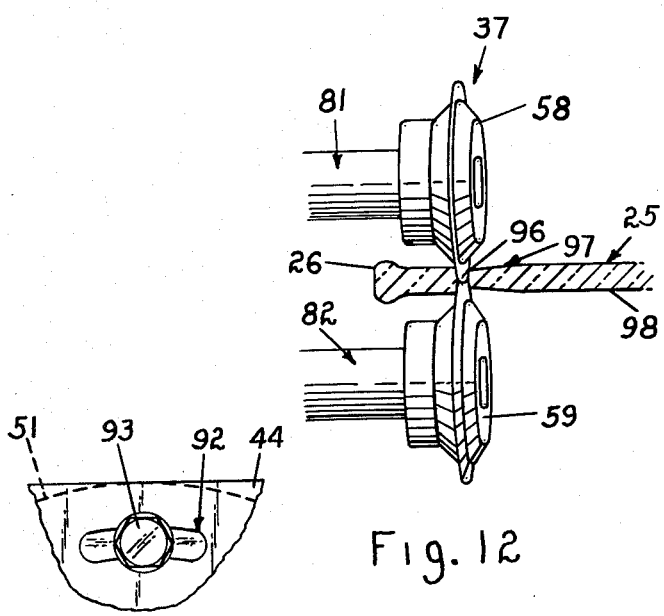

United States Patent Office 3,124,444
Patented Mar. 10, 1964

3,124,444
METHOD AND APPARATUS FOR REMOVING EDGES DURING FORMING OF SHEET GLASS
George F. Ritter, Jr., Delmar E. Carney, Roy A. Nyquist, and Alfred H. Miller, Toledo, Ohio, assignors to Libbey-Owens-Ford Glass Company, Toledo, Ohio, a corporation of Ohio
Filed Mar. 25, 1960, Ser. No. 17,627
13 Claims. (Cl. 65—25)

The present invention relates broadly to a method and apparatus for forming sheet glass. More particularly, it relates to an improved method and apparatus for continuously removing the marginal edge or border portions of a moving ribbon of glass while it is in a plastic condition.

This invention is of particular utility in connection with the forming of continuous sheet glass which is to be subsequently ground and polished to produce plate glass. In such a method, molten glass is flowed continuously from a melting furnace through a horizontal outlet in one end thereof between a pair of forming rolls which reduce the glass to sheet form, with the sheet then being carried forwardly through an annealing lehr and subsequently ground and polished.

It has been found that shortly after the sheet emerges from between the forming rolls, there is a tendency for the edges of the sheet to either curl upwardly or assume a bulbous shape, so that the marginal edges project above the surface of the major portion of the sheet. This has resulted in considerable breakage of the sheet in both the annealing of the glass and in the subsequent surfacing of the sheet. In addition, the marginal edge portions of the sheet are frequently imperfect in other respects. In order to overcome these disadvantages, it has been proposed to remove the marginal edge portions of the sheet prior to the annealing operation.

Therefore, it is the primary object of this invention to provide a novel method and apparatus for removing the marginal edge portions of the sheet by a shearing action as the sheet emerges from between the forming rolls and while the sheet is still heated to a high degree and is in a plastic condition.

Since the sheet, as it emerges from between the forming rolls, is easily deformed or marred, the apparatus herein provided for removing the edge portions of the sheet is combined with apparatus for supporting the sheet on a film or layer of a fluid, preferably air. This combination produces a high quality sheet of a uniform width and thickness and in which the edges thereof do not project above the central portion of the sheet.

It is therefore another important object of this invention to provide a method and apparatus for shearing the marginal edge portions from a continuously advancing sheet of glass while the sheet is supported on a layer of air.

Another object of this invention is to provide shearing aparatus including cutting discs or knives rotating in the direction of movement of the sheet.

Another object of this invention is to provide novel apparatus for mounting the shearing knives at each side of the path of travel of the sheet including means for individually moving the shearing knives into and out of the path of the advancing sheet, and means for synchronizing the rate of rotation thereof.

A further object of this invention is to provide apparatus for pivoting each shearing apparatus so that the shearing knives exert an outwardly directed pull on the marginal portions of the sheet inside the shear lines whereby to reduce the thickness of the marginal edges to less than the thickness of the sheet in the central portion thereof.

Other objects and advantages of the invention will become more apparent during the course of the following description, when taken in connection with the accompanying drawings.

In the drawings wherein like numerals are employed to designate like parts throughout the same:

FIG. 2 is an elevation of the apparatus of FIG. 1 as viewed from the right;

FIG. 4 is a sectional view taken on line 4—4 of FIG. 3 showing the chain and sprockets for rotating the shearing knives;

FIG. 5 is a view taken along line 5—5 of FIG. 3 showing the mechanism for pivoting one of the shearing devices within a limited arc;

FIG. 6 is a cross-section taken through the mounting head of one of the shearing devices on line 6—6 of FIG. 1;

FIG. 7 is a cross-section taken on line 7—7 of FIG. 6;

FIG. 8 is a cross-section taken on line 8—8 of FIG. 2 showing the relationship between the sheet of glass, a shearing device and the apparatus for supporting the sheet on a film of air;

FIG. 9 is a sectional view taken substantially on line 9—9 of FIG. 8 showing the relative positions of the sheet of glass and a shearing device;

FIG. 10 is a plan view showing a shearing device pivoted with respect to an edge of the sheet;

FIG. 11 is a sectional view taken on line 11—11 of FIG. 10 illustrating the relative positions of the sheet of glass and a shearing device; and FIG. 12 is a fragmentary sectional view taken substantially on line 12—12 of FIG. 11 illustrating how the knives stretch and shear the sheet to reduce the thickness in the marginal area extending inwardly from the shear line.

Figure 1:
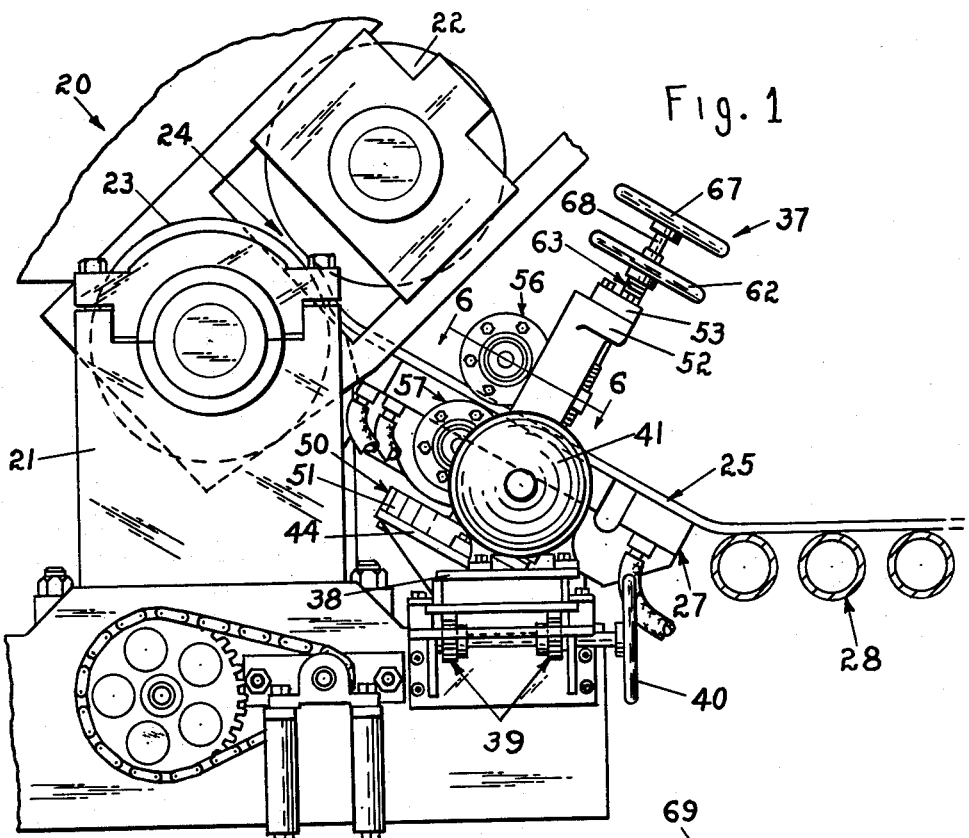
FIG. 1 is a side elevation of the shearing apparatus of the present invention mounted on the framework of a glass melting furnace.

Referring particularly to FIGS. 1 and 2 of the drawings, the numeral 20 generally indicates the exit end of a continuous glass melting furnace for containing a mass of molten glass and which includes a framework 21 for supporting the upper and lower sheet forming rolls, respectively indicated by the numerals 22 and 23, spaced from one another to define a longitudinally extending pass 24 therebetween which determines the thickness of the sheet 25. As shown in FIGS. 9, 10 and 12, the continuous sheet of glass 25 emerging from between the forming rolls is normally provided with enlarged or bulbous edges 26 of greater thickness than the central portion of the sheet.

Due to the increased thickness of the sheet at the edges, it is difficult to properly anneal the sheet and, in addition, if the sheet is subsequently ground and polished, pressure is concentrated on the edges of the sheet in the initial grinding stages resulting in excessive breakage, particularly when the grinding runners are circular and larger in diameter than the width of the sheet.

The numeral 27 generally indicates an apparatus for supporting the newly formed sheet of glass on a film of fluid, preferably air, during the initial cooling period wherein the sheet solidifies sufficiently so that it may be safely transferred to a mechanical support, such as a roller type conveyor 28, for advancing the sheet into and through an annealing lehr. While the sheet of glass 25 is in the area of the support apparatus 27, it is in a plastic state and is highly susceptible to surface marking and deformation which impair its optical qualities. Therefore, the sheet support apparatus is provided with a plane surface underlying the sheet of glass and is inclined downwardly from the forming rolls 22 and 23 so that the sheet of glass is advanced through this area supported on a film of air to retain the quality of the drawn sheet. As shown in FIG. 2, the angle of inclination of the sheet support 27 may be adjusted by manipulating jackscrews 29.

The sheet support apparatus 27 is fully disclosed in Patent No. 2,878,621, issued to Zellers et al. on March 24, 1959. Briefly stated, the apparatus 27 is comprised of one or more chambers 30 (FIG. 8) supplied with compressed air from a suitable source. The top wall 31 of each chamber is perforated in a uniformly distributed pattern, as indicated by the numeral 32, so that the air forms a film 33 between the upper surface 34 of the top wall 31 and the lower surface 35 of the sheet of glass, thus maintaining the sheet of glass out of contact with the upper surface 34 of the support. As shown in FIGS. 2 and 8, an opening 36 is provided adjacent an edge of the sheet support 27 to provide clearance for a rotary shear, which is disclosed hereinafter.

A shearing mechanism or device, generally designated by the numeral 37, is provided at each side of the sheet outwardly thereof and is mounted upon a platform 38, carried by the framework 21 of the furnace as shown in FIGS. 1 and 2. Each shearing mechanism is adjustable transversely of the sheet by means of a rack and gear arrangement 39 operated by a handwheel 40.

Figure 3:
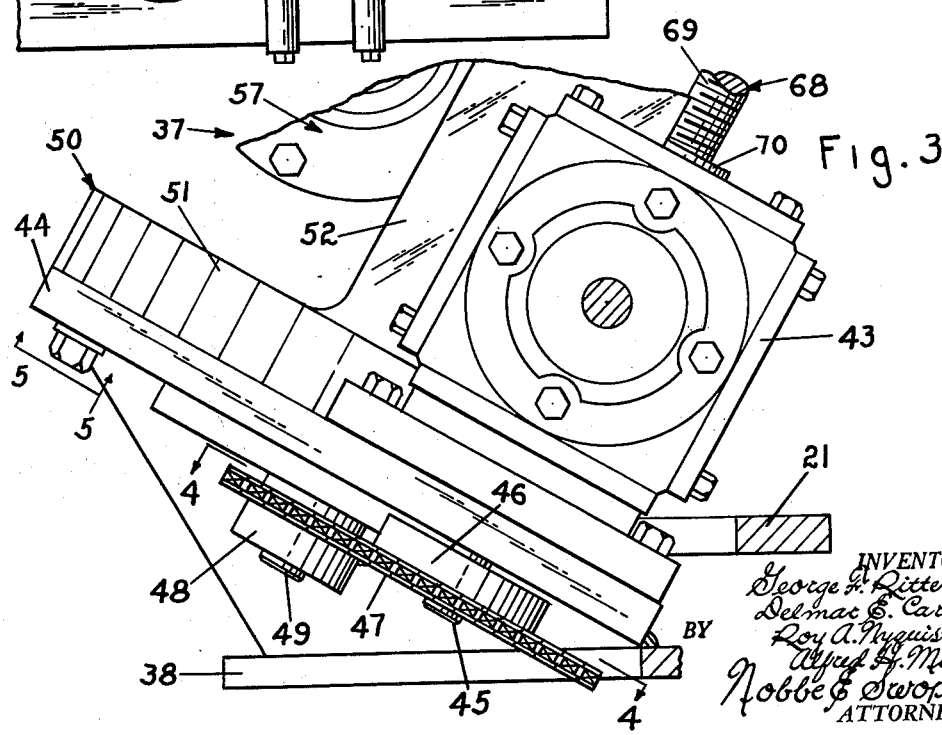
FIG. 3 is a sectional view taken on a line 3—3 of FIG. 2 showing the base for mounting the shearing apparatus and a portion of the apparatus for rotating the shearing discs or knives.

An electric motor 41, mounted on the platform 38, is connected through a coupling 42 to a right angle drive gear box 43 mounted on a plate 44 in inclined relation to the platform 38 and in parallel relation to the sheet support apparatus 27. As shown in FIGS. 3 and 4, the output shaft 45 of the gear box 43 carries a sprocket 46 which is connected by a chain 47 to a sprocket 48 keyed to a drive shaft 49 for a shearing mechanism 37.

FIGS. 1 and 2 show a shearing mechanism 37 mounted on the plate 44 and rising in a direction normal to the top surface of the plate. FIGS. 1 and 3 illustrate the mounting of a shearing mechanism so that it may be pivoted about the longitudinal centerline of the shaft 49. Thus, the base 50, for the shearing mechanism 37, is comprised of a flange 51 and a bifurcated projection 52 rising from the base in a direction normal to its top surface and provided with a cap 53 joining the upper portion of the bifurcated projection. The drive shaft 49 is journaled for rotation in the flange 51. As shown in FIGS. 6 and 7, ways 54 are fastened to the inner face of each leg of the bifurcated projection by screws 55. As shown in FIGS. 1 and 2, a pair of identically constructed knife holders, respectively indicated by the numerals 56 for the upper and 57 for the lower, are guided by the ways 54 so that an operator may individually move the circular cutting discs or knives 58 and 59 comprising a shearing mechanism 37 into shearing relation in the path of an advancing sheet of glass 25 and also separate the knives so that the sheet will pass through the gap provided by the separation.

The structure for moving the knives 58 and 59 into and out of shearing position without disconnecting the means for rotating the knives is shown in detail in FIGS. 6 and 7. A gear box 60 is provided with a pair of grooves 61 for receiving the ways 54 thereby guiding the upper and lower knife holders 56 and 57 for movement in a direction normal to the upper and lower surfaces of the sheet of glass.

The upper knife holder 56 is raised and lowered by manipulating a handwheel 62 (FIGS. 1 and 2) to rotate a tubular shaft 63 (FIGS. 1, 6 and 7) which is provided with threads 64 at the lower end which engage threads 65 formed internally within a boss 66 projecting from one side of the gear box 60.

The gear box for the lower knife holder 57 is raised and lowered by rotation of a handwheel 67 (FIGS. 1 and 2) to rotate a shaft 68 which is telescoped within the shaft 63 and is provided with threads 69 at the lower end which engage matching threads in the boss 70 (FIG. 3) of the gear box for the lower knife holder 59.

As previously disclosed, the construction of the upper and the lower knife holders 56 and 57 is substantially identical, therefore, to avoid repetition only the upper knife holder 58 is shown in detail.

The drive shaft 49 extends upwardly from the sprocket 48 through a bearing contained in the flange 51 and through the gear boxes of the lower and the upper knife holders, respectively indicated by the numerals 57 and 56. The shaft 49 is provided with a pair of diametrically opposed grooves 71 extending downwardly from the top end through both knife holders. An elongated key 72 is held in each groove and each is received by a groove 73 extending longitudinally through the bore 74 of a worm 75 positioned for rotation within the gear box 60 by thrust rings 76 and bearings 77 retained by a pair of end caps 78. This design maintains the worm 75 in engagement with the shaft 49 but also allows movement of the worm longitudinally on the shaft 49.

The worm 75 is in engagement with a worm gear 79 which is secured for rotation by a key 80 to a hollow knife holding spindle. The spindle for the upper knife holder 56 is designated by the numeral 81 and the spindle for the lower knife holder is designated by the numeral 82. Each of the spindles 81 and 82 is supported on a pair of bearings 83 retained in flanged closures 84 and 85 for the gear box 60 and respectively project inwardly over and under the edge 26 of the sheet of glass 25. The circular knives 58 and 59 are respectively mounted on the ends of spindles 81 and 82 by keys 86 and set screws 87 (FIG. 8).

As illustrated in FIG. 8, the sheet of glass 25 is advancing at a constant rate in the direction of the arrow 88, the knife 58 in the direction of the arrow 89 and the knife 59 in the direction of the arrow 90. Since both of the knives 89 and 90 comprising a shearing mechanism 37 are driven from the shaft 49, it is obvious that the worm gear sets of an upper and a lower gear box are opposite in hand with the direction of rotation of the output shaft of the motor 41 governing which gear box is right hand and which is left hand.

As shown in FIGS. 6 through 9, the spindles 81 and 82 are hollow as indicated by the numeral 91 to provide a passageway for a coolant to each of the knives 58 and 59.

As shown in FIGS. 2, 3 and 5, each shearing mechanism 37 is pivotable about the shaft 49 within the limits of slots 92 (FIG. 5) penetrating the plate 44 and extending along a radius originating at the center of the shaft 49. The body of a screw 93 is passed through each slot 92 to enter a tapped opening in the flange 51 so that by tightening the screw, the shearing mechanism may be retained in one of several positions. This arrangement provides means for changing the angle of the shearing mechanism 37 relative to the edge 26 of the sheet 25. FIG. 9 shows the shear 37 in parallel with the edge 26 while in FIG. 10 the shear 37 is pivoted in the direction in which the sheet is advancing to include an angle of approximately 5° between the edge of the sheet and the shearing edge. With the shear positioned parallel with the edge of the sheet 25, as in FIG. 9, the edge 26 is severed from the sheet by a straight shearing action. However, with the shear 37 set at the angle shown in FIG. 10, the knives 57 and 58 first contact the sheet in the areas 94 and 95 (FIG. 11) and as they progress into the area of overlap 96 both knives exert an outwardly directed pull on the sheet before severing the edge 26 therefrom. The outwardly directed pull stretches the sheet 25 in the marginal area 97 adjacent the inner edge of the shear line thereby reducing the thickness of the sheared marginaled edge 97 to less than the thickness of the central portion 98 of the sheet 25.

We claim:

1. Apparatus for forming sheet glass wherein a mass of molten glass is reduced to a continuous sheet of uniform thickness by a pair of counter-rotating forming rolls and the newly formed sheet is conveyed forwardly into an annealing zone, including means disposed in the path of said sheet adjacent said forming rolls for continuously removing the marginal edge portions of said sheet as said sheet advances and while it is in a plastic condition.

2. An apparatus as defined in claim 1, in which the means for removing the marginal edge portions of the sheet comprises a pair of coacting rotary cutting discs positioned inwardly from each edge of said sheet and operating respectively upon the upper and lower surfaces thereof.

3. An apparatus as defined in claim 2, including means located at each side of the path of travel of the sheet for supporting said cutting discs, and means for adjusting each pair of said discs transversely with respect to the adjacent edge of said sheet.

4. An apparatus as defined in claim 3, in which the means for supporting said cutting discs includes means for supporting said discs above and below said sheet, and means for rotating said discs in the direction of movement of the sheet.

5. An apparatus as defined in claim 4, including means for individually moving each of said cutting discs in a direction normal to the surfaces of the sheet.

6. An apparatus as defined in claim 4, including means for adjusting the angle of each pair of said cutting discs relative to the adjacent edge of said sheet.

7. Apparatus for forming sheet glass wherein a pair of forming rolls receive molten glass from a melting furnace and reduce it to a continuous sheet form, characterized by a plane surface underlying said sheet as it advances from between said forming rolls, means for interposing a fluid film between said surface and the undersurface of the newly formed sheet, and means disposed in the path of said sheet while it is supported above said plane surface for removing the marginal edge portions of said sheet.

8. In sheet glass apparatus as defined in claim 7, in which the means for continually removing the marginal edge portions of said sheet comprises a pair of coacting rotary cutting discs positioned inwardly from each edge of the sheet and acting upon the upper and lower surfaces thereof.

9. In sheet glass apparatus as defined in claim 8, including means for adjusting each pair of cutting discs transversely with respect to the adjacent edge of said sheet, and means for individually moving each of the cutting discs in a direction normal to the surfaces of the sheet.

10. In sheet glass apparatus as defined in claim 9, including means for rotating each pair of discs at a synchronized speed in the direction of movement of said sheet, and means for adjusting the angle of each pair of cutting discs relative to the adjacent edge of said sheet.

11. In sheet glass apparatus as defined in claim 7, in which the means for removing the marginal edge portions of the sheet includes a rotary shear at each side of the sheet and said plane surface underlying the sheet has an opening at each end thereof to provide clearance for the respective shear.

12. A method of removing the marginal edge portions from a newly formed continuous sheet of glass while the sheet is still in a plastic condition, comprising advancing said sheet along a predetermined path, supporting said sheet as it advances along said path on a fluid film, and continuously removing the marginal edge portions of the sheet while said sheet is in a plastic condition and is supported on said fluid film.

13. A method of removing the marginal edge portions from a newly formed continuous sheet of glass while the sheet is still in a plastic condition, comprising advancing said sheet along a predetermined path, supporting said sheet as it advances along said path on a fluid film, shearing the marginal edge portions from the sheet while said sheet is in a plastic condition and supported on said fluid film, and stretching the marginal edges of the sheet inside the shear lines laterally prior to shearing whereby to reduce the thickness of the sheet at the edges thereof.

References Cited in the file of this patent

UNITED STATES PATENTS

| | | |
|---|---|---|
| 667,007 | Dolan | Jan. 29, 1901 |
| 1,122,692 | Colburn | Dec. 29, 1914 |
| 1,310,451 | Shields | July 22, 1919 |
| 1,735,573 | Henderson | Nov. 12, 1929 |
| 2,262,988 | Brown et al. | Nov. 18, 1941 |
| 2,444,731 | Devol | July 6, 1948 |